United States Patent [19]

Forbus et al.

[11] Patent Number: 5,624,488
[45] Date of Patent: Apr. 29, 1997

[54] ULTRAHIGH BRIGHTNESS CALCINED CLAY PIGMENT, MANUFACTURE & USE THEREOF

[75] Inventors: Ellen S. Forbus, Gray; Paul R. Suitch, Milledgeville; Thomas Dombrowski, Macon, all of Ga.

[73] Assignee: Engelhard Corporation, Iselin, N.J.

[21] Appl. No.: 497,241

[22] Filed: Jun. 30, 1995

[51] Int. Cl.$^6$ .................................................. C04B 14/10
[52] U.S. Cl. .................. 106/484; 106/486; 501/145; 241/22; 241/23; 241/29; 241/24.1; 209/162; 162/181.1; 162/181.8; 428/537.5
[58] Field of Search .................................. 106/484, 486; 501/145; 241/22, 23, 24.1, 29; 209/162; 162/181.1, 181.8; 428/537.5

[56] References Cited

U.S. PATENT DOCUMENTS

| | | | |
|---|---|---|---|
| 2,990,958 | 7/1961 | Greene et al. | 209/166 |
| 3,014,836 | 12/1961 | Proctor | 162/181 |
| 3,058,671 | 10/1962 | Billue | 241/24 |
| 3,171,718 | 3/1965 | Gunn et al. | 100/416 |
| 3,343,973 | 9/1967 | Billue | 106/486 |
| 3,519,453 | 7/1970 | Morris et al. | 106/486 |
| 3,586,523 | 6/1971 | Fanselow et al. | 106/486 |
| 3,743,190 | 7/1973 | Whitley | 241/4 |
| 4,246,039 | 1/1981 | Mixon, Jr. | 106/484 |
| 4,381,948 | 5/1983 | McConnell et al. | 106/288 |
| 4,492,628 | 1/1985 | Young et al. | 209/5 |
| 4,738,726 | 4/1988 | Pratt et al. | 106/487 |
| 5,011,534 | 4/1991 | Berube et al. | 106/416 |
| 5,137,574 | 8/1992 | Suitch et al. | 106/439 |
| 5,371,051 | 12/1994 | Pope et al. | 501/145 |
| 5,393,340 | 2/1995 | Slepetys et al. | 106/484 |
| 5,454,865 | 10/1995 | Ginn et al. | 106/486 |

*Primary Examiner*—Mark L. Bell
*Assistant Examiner*—Michael Marcheschi
*Attorney, Agent, or Firm*—Inez L. Moselle

[57] ABSTRACT

A selected kaolin crude or crude fraction is purified by physical or physical/chemical means, such as froth flotation and/or selective flocculation, to remove discrete particles of $TiO_2$ and in some cases, discrete iron minerals. The pure (or purified clay) must then be agitated in the presence of water with a particulate grinding media such as, for example, sand, alumina or zirconia beads, to increase the 2 micron content of the kaolin. An intermediate ground product that contains a substantial weight percentage of particles finer than 1 micron is generated as a result of grinding. The particles finer than 1 micron in the ground kaolin also include those particles in the previously pure or purified kaolin that were present in the naturally occurring clay. A pulp of the ground clay is then fractionated to remove particles larger than 2 microns, e.g., to remove at least 95%, preferably at 100% by weight, of the particles larger than 2 microns, while minimizing the removal of particles finer than 1 micron. The resulting fine particles size fraction is then treated by conventional series of steps, i.e., optional bleaching, drying, pulverization, calcination and repulverization to produce a low abrasion, ultrahigh brightness (typically 96%) calcined kaolin pigment.

6 Claims, No Drawings

ULTRAHIGH BRIGHTNESS CALCINED CLAY PIGMENT, MANUFACTURE & USE THEREOF

FIELD OF THE INVENTION

This invention relates to calcined, low abrasion, high brightness calcined kaolin clay pigments, their manufacture from selected soft kaolin crudes and the use thereof in the manufacture of paper products.

BACKGROUND OF THE INVENTION

One of the seminal developments in the industrial minerals field was the discovery that calcination of a particular type of poorly crystallized, ultrafine tertiary kaolin clay, known in the art as "hard" kaolin, resulted in bright, e.g., 93.5% GE brightness, pigments having desirable low abrasion and outstanding potential to provide opacity to filled and coated paper products. Reference is made to U.S. Pat. No. 3,586,523, Fanselow et al (1971). Products made in accordance with the teachings of this patent by the assignee and its licensees have accounted for a substantial proportion of the sales of high performance industrial minerals in the United States and abroad. Aside from possessing a unique combination of high brightness, low abrasion and opacification potential, the processing was remarkably economical because of the unique morphology as well as inherently fine particle size and desirable particle size distribution of the kaolin in the crude. In such crudes, colored impurities, in particular iron-contaminated titania particles, concentrate in the coarse fraction of the crude. Thus, conventional degritting and fractionation to recover calciner feed yield a fine fraction of hydrous kaolin with a lower content of colored titania than the crude. As a result of these factors, the yield of calcined kaolin product was high, e.g., roughly about 50% based on the weight of degritted crude or about 40% by weight of the particles finer than 1 micron in the degritted crude.

Unlike the hard Georgia Tertiary kaolins that are poorly crystallized and have an average particle size of about 0.3 microns, (equivalent spherical diameter or e.s.d.), the soft kaolins that are present in even greater abundance in Georgia, U.S.A. and throughout the world are composed of much larger, well crystallized kaolin particles having an average particle size of approximately 0.6 microns, e.s.d., roughly twice that of the hard kaolins. Fractionation of a soft clay to isolate the fine size fraction of the crude having generally the same average particle size and particle size distribution of a typical degritted hard kaolin would represent only about a 15% yield (or 85% loss) of degritted kaolin. Thus, assuming that calcination of such a fine fraction of a degritted soft kaolin would result in a bright, low abrasion opacifying pigment, at least comparable in all significant performance characteristics to calcined pigments prepared from hard clay, the processing would not be economically viable.

It is well known in the industry that the brightness of uncalcined and calcined kaolin pigments is adversely affected by the presence of colored impurities, notably titaniferous and ferruginous impurities. It has long been the practice to remove these impurities to various extents by physical or physical-chemical means, such as froth flotation, selective flocculation, magnetic purification, bleaching and combinations thereof. It is also known that calcination generally increases brightness of a hydrous kaolin when the clay is "fully" calcined, i.e., calcined to undergo the characteristic exotherm, and may decrease in brightness when the clay is calcined under less severe conditions, i.e., to so-called "metakaolin" state. Thus, 90% brightness (fully) calcined pigments can be produced readily from hard crudes by degritting, fractionation, bleaching and calcination; 93% brightness pigments can be obtained from the same crudes by adding one or more steps to remove colored impurities, especially titaniferous matter. The Fanselow et al patent (supra) discloses 95% brightness calcined kaolin pigments.

Attempts were recently made to produce calcined pigments having much higher brightness from the hard kaolin crudes that are readily processed to provide 93+% brightness calcined kaolin pigments. To the best of our knowledge, there is at present no means to produce calcined kaolin pigments having a 95+% brightness merely by decreasing the content of colored impurities in the hard kaolin by conventional means such as flotation.

On the other hand, there are reports in the patent literature dating back to the early '60's of the recovery of calcined kaolin pigments having 96% brightness and higher from certain Georgia kaolins crudes. These crudes are obviously of the soft type as evidenced by information about particle size and particle size distribution in the patents. Reference is made to the following:

U.S. Pat. No. 3,058,671 (1962) Billue
U.S. Pat. No. 3,343,973 (1967) Billue
U.S. Pat. No. 3,171,718 (1965) Gunn, et al Billue allegedly discovered that media grinding of the coarse fraction of kaolins resulted in "fracture-induced" brightness and found that the enhanced brightness was carried over when the fractured kaolin was fully calcined. Specifically, Billue isolated from a naturally occurring crude a coarse fraction that contained not more than 35% by weight of particles finer than 2 microns, i.e., a coarse fraction of crude containing at least 65% by weight of particles larger than 2 microns. In Example II (both patents), a coarse fraction of kaolin was "fractured" to produce a fractured clay having an initial brightness of 89.1%. This hydrous kaolin was calcined to produce a product having a brightness of 96.3% (col.7). However, data in the patent reveal that the portion of the clay that was fractured (the 86% minus 2 micron cut) represented a meager 28.8% by weight of the crude. Thus, while calcined brightness was very high, the process depended upon the removal of minus 2 micron fines before grinding and would be commercially useless unless the higher brightness would compensate for the high cost associated with low yield. Billue did not report the abrasion value or provide information about the opacification potential of his 96.3% brightness calcined clay. Gunn et al teach media grinding of coarse filler clay in the production of calcined kaolin pigments made by mechanical delamination of a coarse hydrous filler clay fraction. Disclosed is a product having a GE brightness value of 95% and "low" abrasion as obtained by a specific modification of a Valley Abrasion test. The clay was delaminated gently to separate kaolin booklets (as contrasted with severe grinding to break particles after delaminating the clay). In an example, delaminated kaolin having a GE brightness of 92.1% was calcined to a GE brightness of about 96%. Gunn et al do not report data such as to permit calculation of yield, however, the teaching of Billue (supra) provide guidance and suggest yield would be low.

The Gunn et al patent also clearly teaches that the finest fraction of the kaolin has the highest content of $TiO_2$ impurity (Example 9). In other words, in this type of kaolin, colored impurities concentrate in the fine end. This is well known to clay mineralogist and the clay industry. It is noted that Gunn et al did not disclose calcining the fine fraction. However, based on the disclosure as to the concentration of colored impurities in the fine end of soft kaolins, one would avoid the presence of excessive fines if seeking brightness from a purified kaolin obtained from a soft kaolin crude. This is consistent with the specific disclosure in the Gunn et al patent of ultrahigh brightness calcined pigments made by processing the coarse fraction of a crude after the removal of fines.

In U.S. Pat. No. 5,137,574, Suitch et al, a high opacifying pigment is produced by calcining one or more high titania content kaolin fractions which are separated from a whole crude by size classification, froth flotation, magnetic separation or the like. In embodiments of the invention, a grinding step is practiced before calcination. The grinding step is said to be necessary in order to reduce the particle size by virtue of the use of a titania enriched product. The calcined product has a brightness in the range of about 70 to 82% and the titania content in greater than 2%. The low brightness product is supplied under the registered trademark OPACITEX. Production of such a pigment by selection of a low brightness kaolin crude is described in U.S. Pat. No. 5,371,051, Pope et al.

McConnell et al, U.S. Pat. No. 4,381,948, now commonly assigned, discloses a process for producing high brightness, low abrasion calcined kaolin pigments having exceptionally high light scattering (superior opacification), a GE brightness of at least 93% and low abrasion (Valley Test Method) when used as a paper filler. Processing involves use of a crude clay containing not more than 0.5% glass forming oxides, not more than 1.5% $Fe_2O_3$ and more than 2% $TiO_2$ and separating a very fine particle size fraction from such crude, i.e., a fraction that is 100% by weight finer than 1 micron, followed by conventional steps of drying, pulverizing, calcining and repulverizing. In all illustrative examples, a hard kaolin crude was processed. The highest brightness disclosed was 94.3%. The patent also teaches that soft Georgia kaolin crudes (identified as crudes that are 50–60% finer than 2 microns) can be used. However, the inventors caution that in such case the particular crude should contain sufficient 1 micron particles to enable "worthwhile recoveries". Teachings sufficient to suggest, much less to enable, the achievement of worthwhile recoveries are not presented in making the disclosure as to the usefulness of soft kaolins.

Moreover, patentees did not deal with the problem inherent in the use of a very fine fraction when using soft kaolin because of the concentration of colored impurities, especially colored titania, in the finest fraction of soft kaolins.

An early patent in the art, U.S. Pat. No. 3,014,836, Proctor, discloses that the particle size of a calcined kaolin product depends on the particle size of the uncalcined kaolin feed and that the feed should be free from abrasive impurities to produce low abrasion, calcined clay. The highest GE brightness value was 93%.

U.S. Pat. No. 3,519,453, Morris et al, mechanically delaminate booklets of a coarse kaolin and calcine to metakaolin conditions in an effort to obtain low abrasion; GE brightness was below 90%. Slepetys et al, U.S. Pat. No. 5,393,340, commonly assigned, severely grind booklets in a coarse kaolin fraction so as to obtain a ground material, the particles of which are substantially all finer than 1 micron as a result of grinding. Patentees then calcine to metakaolin to obtain ultralow Einlehner abrasion; brightness was about 90%. Thus, ultrahigh brightness calcined kaolin, 95–96% and above, has been reported as has calcined kaolins characterized by low abrasion (by various methods including the now obsolete Valley method), high opacification or combinations thereof. Prior to this invention, however, brightness values above 95% have been achieved only by processing fractionated soft kaolin crude by steps that resulted in economically unattractive yields and do not inherently provide calcined kaolin pigments that also possess sufficiently high light scatter for paper use combined with the extremely low abrasion values now demanded by the paper industry. On the other hand, high yields have obtained when using hard crudes but 96% brightness products were not produced. Grinding and/or delamination prior to calcination have been advocated with kaolin but not in a process that results in pigments brighter than 95% at high yields, for example a recovery in excess of 45%, based on the weight of particles finer than 1 micron in the crude.

SUMMARY OF THE INVENTION

We have invented a simple method for processing kaolin clay that results in a calcined pigment having both low abrasion, ultrahigh GE brightness (at least 95.0%, preferably at least 95.5%, most preferably at least 96.0%), and high light scatter, using a novel combination of steps that results in remarkably high yields of the calcined product.

Our method features the selection of a degritted soft kaolin crude that contains from about 50 to 60% by weight of particles finer than 2 microns or, preferably, a fraction of degritted soft kaolin crude that is from about 60 to 85% by weight finer than 2 microns, the crude or crude fraction possessing the following combination of properties: iron content (as $Fe_2O_3$) below 0.80%, preferably below 0.60 wt. %, and most preferably below 0.45 wt. %, and $TiO_2$ below about 1.80 wt. %, preferably below 0.75 wt. % and most preferably below about 0.50 wt. %. The minus 2 micron component of the degritted material contains less than a total of 2.0% preferably, less than 1.0%, and most preferably less than 1.0% of any of the following impurities: mica, quartz, cristobalite (or other forms of silica), or smectite (montmorillonite) minerals; less than about 1% by weight of the selected degritted crude or crude fraction is composed of particles larger than 325 mesh (U.S. Sieve).

Unless the $TiO_2$ content of selected crude or crude fraction is below 1%, it must then be purified by physical or physical/chemical means, preferably by froth flotation, high intensity magnetic separation (HIMS), selective flocculation or combinations thereof, to remove discrete particles of $TiO_2$ and in some cases, discrete iron minerals. The pure (or purified clay) must then be agitated in the presence of water with a particulate grinding media such as, for example, glass beads, sand, alumina or zirconia beads, to increase the 2 micron content by at least 20%, preferably 25 to 30%, in the case of a degritted crude or at least 10%, and preferably from about 15 to 20% in the case of fractionated crude, and to result in a ground material that is at least about 75%, preferably 80 to 87%, finer than 1 micron. Thus, an intermediate ground product that contains a substantial weight percentage of particles finer than 1 micron is generated as a result of grinding. The particles finer than 1 micron in the ground kaolin also include those particles in the previously pure or purified kaolin that were present in the naturally occurring clay. A pulp of the ground clay is then fractionated to remove particles larger than 2 microns, e.g., to remove at least 95%, preferably 100% by weight, of the particles larger than 2 microns, while minimizing the removal of particles finer than 1 micron. The resulting fine particles size fraction is then treated by conventional series of steps, i.e., optional bleaching, drying, pulverization, calcination and repulverization.

In one embodiment of the invention (using degritted but unfractionated coarse soft kaolin), the process comprises the following steps;

a) providing a degritted soft kaolin crude that is from 50–65% by weight finer than 2 microns, e.s.d. and contains substantially all the minus 1 micron particles present in the degritted naturally occurring clay, the degritted crude containing from 0 to 1.8% by weight $TiO_2$ and 0 to 0.8% by weight $Fe_2O_3$ based on the dry weight the degritted crude, and having low levels of mica, quartz or other silica minerals and montmorillonite minerals;

b) removing colored impurities by selective flocculation, froth flotation or combinations thereof to reduce the titania content thereof to a level below 1% if the titania content exceeds 1% in step (a);

c) agitating the degritted kaolin clay in the presence of water with particulate grinding media until the particle size is from 85–92% by weight finer than 2 microns;

d) removing sufficient particles larger than 2 micron from the product of step (c) by sedimentation or centrifugation to produce a product that is about 95–100% by weight finer than 2 micron and about 88–92% finer than 1 micron and to provide calcined feed that is at least 40% by weight of the clay from step (a); preferably bleaching the fractionated clay;

e) spray drying the recovered product of step (d) pulverizing, fully calcining and repulverizing in conventional manner and;

f) recovering the calcined product having a GE brightness of at least 95%, and Einlehner abrasion below 25 and a white color. (L value greater than 98)

In preferred embodiment, the improved process for producing an ultra high brightness, low abrasion kaolin clay pigment from a soft kaolin crude comprises:

a) selecting a soft kaolin clay crude that contains less than a total of 1% by weight quartz or other crystalline silica minerals, mica, and smectite minerals in the minus 2 micron fraction thereof, the crude containing less than 0.8% $Fe_2O_3$ and less than 1.8% $TiO_2$ after removal of grit in step (b), b) removing grit from said crude, c) fractionating the resulting, degritted crude and recovering a fine size fraction thereof that is from 60 to 85% by weight, preferably about 76% to 82%, e.g., about 80% by weight, finer than 2 microns, e.s.d., d) subjecting the resulting fraction from step (c) to flotation, selective flocculation or combination thereof to remove colored impurities and recovering a beneficiated fraction of clay that contains from 0–0.8% $TiO_2$ and from 0–0.8% $Fe_2O_3$, e) agitating the beneficiated fraction of kaolin with particulate grinding media until from 95–100% by weight is finer than 2 microns, e.s.d., f) removing sufficient particles larger than 2 micron e.s.d. from the product of step (e) to result in calciner feed that is about 90–95% finer than 1 micron, e.s.d., and represents at least 50% by weight of the degritted crude from step (b); optionally bleaching, g) spray drying the recovered product of step (f);

h) pulverizing, fully calcining and repulverizing the product of step (g) in conventional manner and;

i) recovering the calcined product having a GE brightness of at least 95%, an Einlehner abrasion below 25 and a white color—(L value of at least 98).

The latter embodiment of the process is preferred because it permits a significantly greater recovery of clay suitable as calciner feed. This improved recovery results from the fact that more of the minus 1 micron particles generated during grinding are recovered when operating with feed that is fractionated to remove some plus 2 micron particles prior to grinding. The removal of the coarse fraction prior to delamination improves the yields and economics of the grinding step.

Calcined kaolin pigments of the invention have a G.E. brightness of at least 95% (typically 95.5–96.8%), an Einlehner abrasion below 27, preferably below 22 mg, typically 19 to 21, and light scatter as determined by the known black glass test procedure of at least 0.2 $m^2/g$ usually 0.312 to 0.317 $m^2/g$. The pigments have a white color, with a more blue shade than commercial 93 brightness calcined kaolins produced from hard crudes. Typical color values are: $L*=97.44$, $a*=-0.58$ and $b*=-2.84$. Particle size is typically 97–100% minus 5 microns, 84–88% minus 2 microns and 55–65% minus 1 micron.

The interaggregate pore volume is from 0.9 to 1.4 cc/g at a pore radius of 2000 to 4000 Angstrom units, preferably 1.0 to 1.3 cc/g, at a radius of 2500 to 3500 Angstrom units, as measured by Mercury Porosimetry.

Calcined kaolin pigments of the invention are useful in coating and filling a variety of paper and paperboard products. The pigments are also useful as extender pigments in paints, plastic and rubber. Presently preferred best modes of use is as a filler for uncoated specialty papers such as premium/specialty printing paper and recycled fiber containing printing papers. In such use, the pigments are a cost effective alternative to hydrated alumina and precipitated silicates.

DETAILED DESCRIPTION

It is well known in the art that when kaolin clay is calcined, it undergoes a series of characteristic changes, detectable by differential thermal analysis (DTA). At about 840°–1200° F. (450°–650° C.), the clay undergoes a strongly endothermic dehydration reaction resulting in the conversion to material known as metakaolin. The metakaolin state is conveniently ascertained by acid solubility testing because the alumina in the clay is virtually completely soluble in strong mineral acid. Typically, about 45% by weight of metakaolin is soluble in hydrochloric acid of 18% strength. In contrast, solubility in hydrochloric acid of the alumina component in hydrated kaolin is very limited. Furthermore, when kaolin is calcined beyond the endotherm at higher temperatures it undergoes a characteristic exothermic reaction, resulting in phase transformation manifested by markedly reduced alumina solubility. Upon further calcination, mullite is crystallized. Formation of mullite is avoided in practice of this invention because mullite is abrasive.

Calcined kaolin pigments have been used for several decades in a number of industrial applications such as paper coating, paper filling, paints, plastics, etc. In these applications they impart to the finished products a number of desirable properties: brightness, opacity, hiding power, strength (in plastics), friction (in paper). Paper coating and filling applications require almost exclusively fine fully calcined kaolin pigments such as the 93% brightness ANSILEX 93® pigment manufactured by Engelhard Corporation. See, for example, U.S. Pat. No. 3,586,523, Fanselow et al, which describes the production of such pigments from ultrafine Tertiary "hard" ultrafine kaolins. Because of high brightness and light scattering properties of these fine fully calcined kaolin pigments, their primary function in paper applications is to provide opacity and brightness, often as a replacement for much costlier titanium dioxide pigments, which can also be used to enhance these functional properties.

Although these fully calcined kaolin pigments obtained by calcining ultrafine hard kaolins are less abrasive than other calcined kaolin pigments, they are relatively abrasive when compared with available noncalcined kaolin pigments. For example, the conventional so-called "low abrasion" calcined kaolin pigments, such as the pigment supplied under the registered trademark ANSILEX 93, typically have an Einlehner abrasion value of about 20 mg. The Einlehner abrasion test is now practiced widely by the industry and has replaced the older Valley test. In practical terms, high abrasion translates into increased wear of bronze web forming screens (wires) on paper making machines, dulling of paper slitter knives, wear of printing plates when they come in contact with coated paper containing fine calcined pigments in the coating formulation, and, in general, wear of any surface that comes in contact with these pigments. Paper makers are becoming increasingly demanding in their need for lower abrasion.

Brightness of calcined kaolin pigments is very strongly influenced by discoloring contaminants. The two most important ones in kaolin pigment technology are iron and titanium oxides. Typically, fully calcined kaolin pigments which are produced from fine hard Middle Georgia Tertiary kaolin crudes, such as those mentioned in U.S. Pat. No. 3,586,523, carry iron and titanium contamination of about 0.90–1.1% $Fe_2O_3$ and 1.0–1.8% $TiO_2$, respectively. While the role of colored impurities in the brightness of calcined kaolin pigments is recognized, prior to this invention those skilled in the art were not successful using this knowledge alone to introduce to the market calcined kaolin pigments with ultrahigh brightness (e.g., 96 GE % brightness or above), in combination with low abrasion and good opacification potential.

This invention uses grinding of coarse kaolin booklets as opposed to delamination to achieve valuable fully calcined kaolin pigments. The terms "delamination" and "grinding", as used herein, are distinguishable. Soft clay deposits contain naturally separated platy kaolin particles as well as "booklets", which comprise stacks of kaolin platelets. These stacks are concentrated in the plus 2 micron portion of soft kaolin crudes. See, for example, the Morris et al. patent, supra and U.S. Pat. No. 3,743,190, Whitley. To accomplish "delamination" of these booklets, comminution of kaolin is carried out under carefully controlled conditions of intensity. The intent of delamination is to provide impact energy which is just sufficient to cleave apart the kaolin platelets comprising the booklets without further fracturing these platelets. The resulting delaminated particles are highly crystalline. The intent in grinding as practiced in the present invention is to achieve a desired degree of comminution with the generation of the highest yield of particles in the desired (finer) particle size range i.e., 1 micron and finer. The difference is most readily apparent by comparing the generation of particles finer than 2 microns (as determined by conventional sedimentation techniques). In delamination, the increase in the content of particles finer than 2 microns particles is generally minimal. In grinding, at least grinding of the type contemplated in practice of this invention, the increase in the content of particles finer than 2 microns is significant. It is typically slightly less than 30% by weight when operating with a degritted crude (full fraction) and about 15 to 20% by weight when operating with a No. 2 fraction (80% by weight finer than 2 microns). Some media grinding operations, for example, the glass microballoon media grinding described in U.S. Pat. No. 3,743,190 (supra) actually effects delamination although the term "grinding" is used. This is suggested by the text of the patent.

It is well known to kaolin pigment technologists that the amount of iron and titanium oxides in soft Middle Georgia clays decreases significantly as the particle size of the clay increases. See also the Gunn et al patent (supra). In other words, these impurities concentrate in the fine particle size fractions of soft clays during fractionation. While our process utilizes substantially all of fine particles (e.g., minus 1 micron particles in the naturally occurring soft clay) most of the fine particles used as calciner feed in our process have been typically generated by grinding coarser kaolin products which have a lower content of colored impurities than the naturally occurring minus 1 micron fraction of the crude. Thus, we must grind degritted crude or a fraction of degritted crude that is low in iron, e.g., less than 0.6% by weight, in order to assure low iron in the recovered calciner feed. Preferably, the degritted crude or fraction used as grinder feed in our process is beneficiated by froth flotation or the like to further remove the undesirable titanium and iron before grinding. Titanium is especially responsive to removal by physical/chemical processing such as froth flotation.

The clay is media milled to grind the kaolin particles to a point where a significant proportion thereof constitutes a suitable size for the production of fine calcined pigments after minimal removal of oversize by fractionation. All particle size values referred to herein are determined by sedimentation using a SEDIGRAPH® 5100 particle size analyzer. Typically, the kaolin charge is ground to at least approximately 85% by weight finer than 2 microns and preferably to at least 90% by weight finer than 2 microns and then separated by gravity or centrifugal sedimentation into a fraction which is typically approximately 85% to approximately 95% by weight finer than 1 micron. The accuracy of measurements at 1 micron and 2 micron is ±2%. Thus, a fraction reported to be 95% finer than 1 micron could be from 93–97% finer than 1 micron. By using a prefractionated clay as feed to the grinding equipment, as opposed to a degritted but unfractionated feed, improved recovery of particles finer than 2 micron is achieved in the classification step following grinding. The fine ground fraction is recovered, washed, dispersed, spray dried, pulverized, calcined and pulverized again. If necessary, high intensity magnetic separation, flotation or other beneficiation techniques can be applied to the clay advantageously after grinding, when some internally lodged impurities are exposed by the grinding.

A suitable kaolin feed is obtained by purifying an unfractionated but degritted soft kaolin crude (about 50–60% by weight finer than 2 microns) by froth flotation to remove colored impurities, e.g., by the procedure described in U.S. Pat. No. 4,492,628, Young et al (the teachings of which are incorporated herein by cross reference). This procedure is referred to in the clay industry as TREP.

Flotation processes such as ULTRAFLOTATION, e.g., U.S. Pat. No. 2,990,958, which operate with prefractionated feed (as opposed to whole, unfractionated feed useful in TREP) is recommended. The teachings of this patent are incorporated herein by cross reference. In adapting ULTRAFLOTATION to the present invention, the degritted crude clay is fractionated into a typical No. 2 coating clay fraction, e.g., a fraction that is about 80% by weight finer than 2 microns. The fraction remaining after removal of the coating fraction can be used elsewhere in a kaolin refining plant.

High intensity magnetic separators (HIMS units) can be used with floated as well as unfloated feed clay to remove paramagnetic colored impurities, preferably before grinding.

The ultrafine hard kaolin used to manufacture ANSILEX 93 and similar calcined kaolin pigments supplied by other kaolin producers is not suitable as the sole source of kaolin in practice of the invention. The fine particle fraction (about 90% by weight finer than 1 micron) derived from this ultrafine kaolin will not result in a pigment of desired brightness upon calcination to using presently available kaolin beneficiation technology. Brightness of about 93–94% is typically obtained. However, such pigments may have the desired low Einlehner abrasion. Similarly, grinding of fully calcined high brightness pigments (i.e., post grinding of previously calcined kaolin pigments) will not yield a fine calcined kaolin pigment displaying a unique combination of high brightness and low abrasion with excellent performance in paper filing and coating.

Grinding is carried out with particulate hard grinding media, and is preferably conducted in the presence of water. This type of operation is conventionally referred to as "wet grinding". The clay feed is preferably placed in the form of an aqueous slip that is sufficiently fluid to be pumped and transported through the grinding equipment. Typically, the clay solids during grinding is from 20–25% by weight.

Usually a clay dispersant is employed to provide a slip of such solids that has useful fluidity in the grinding equipment. Preferred dispersant is ammonium polyacrylate, but sodium polyacrylate or other organic dispersants employed in kaolin pigment processing can also be used. The amount of dispersant used is typically 0.05% to 0.10% based on the weight of clay. An excess of dispersant beyond that needed for good dispersion may be added at the beginning of the milling period (or in the grinder feed, if continuous operation is used) to allow for the newly developed surface area during the grinding operation.

The grinding media should be a dense hard particulate material which does not discolor the clay charge or leave objectionable residues in the ground clay. Density of the grinding media is preferably at least 2.4. A preferred medium is glass beads (such as 20–40 mesh). Examples of other milling media are alumina, zircon, small ceramic balls, coarse sand, plastic cylinders, beads, or pellets of nylon, styrene-divinyl benzene copolymer, polyethylene or other plastic. Grinding should take place in equipment which is not degraded by the grinding media since this may result in staining of the ground clay charge.

Most preferably, the milling media is minus 20 plus 50 mesh (US sieve) glass beads. Generally, the volume of beads to clay slurry varies between 20–70%, most preferably between 35% and 50%. The clay feed to the process should typically be controlled between 20% to 50% solids; however, optimum processing conditions are often achieved between 35 and 45% solids.

A suitable vessel used for the process contains vertical baffles and typically has a height to diameter ratio greater than 1.0 and optimally 1.5 to 2.0. Such a vessel is equipped with an agitation system containing multiple agitator elements attached to a vertical shaft. The number and spacing of the agitators must be optimized for the specific process conditions in order to impart the necessary combined shear and percussive and frictional energy input necessary to overcome the Van der Waals forces holding individual platelets in a stacked array. Energy input required for delamination will vary due to differences between crudes, process conditions, and equipment; typically, requiring 10 to 50 horsepower hour per ton of clay charged to the delaminators.

Conventional pre and post processing steps such as flotation, selective flocculation, magnet separation, floc/filtration, bleaching and spray drying may be employed.

In the following examples, delamination was performed in a standard stirred tank delaminator using glass beads at solids content between 20 and 30%. The bead content of the delaminators was 45–50%. Delamination was performed in a batch system for 30–60 minutes. A slurry of delaminated kaolin pigments was bleached with a hydrosulfite bleach to meet a brightness specification and flocced with sulfuric acid (target pH 3.5) and alum (at 6 lbs/ton of dry clay) for filtration. Filtration in the following examples was performed using pan filters. The filtercake was washed and re-dispersed using a blend of soda ash and polyacrylate (C-211) as a dispersant. This was followed by spray drying.

Grinding time will depend on the specific mechanical details of the grinding unit (bead size, specific gravity, charge, clay solids, intensity of agitation, etc.) and the coarseness of the clay feed. Typically grinding time is 20–60 minutes in the laboratory impeller driver unit. In a commercial unit, the average retention time is about 40–60 minutes.

The slip of fine particle size ground clay is passed through a centrifuge to remove particles larger than 2 microns and then optionally further purified by magnetic separation and brightened by a bleach such as sodium hydrosulfite (dithionite). The clay is then filtered and washed. The filter cake is dispersed preferably with ammonium polyacrylate before spray drying. Prior to conversion to fully calcined kaolin, the ground clay must be pulverized. Commercial vertical and horizontal rotary calciners can be used to produce conventional low abrasion calcined kaolin pigments. Operation is controlled to avoid calcining at sufficiently high temperatures to form mullite. Suitable calcination temperatures are in the range of 1950° to 2100° F. (1065°–1150° C.).

In the examples, samples were calcined in open refractory trays in a muffle furnace at temperatures of 1065°–1150° C. for 52 min. The trays were rotated 180° after 30 minutes.

After calcination, the material is pulverized. In the laboratory-scale examples, this was done in a single pass through a MICROPULVERIZER® mill equipped with a 0.020" round hole screen. In commercial operation, this could be accomplished in a HURRICANE® mill.

The following examples are given for illustrative purposes.

The following test procedures were employed to obtain values reported herein. The disclosures in the cited patents are incorporated herein by cross-reference.

G.E. brightness—TAPPI T646 om—86

Black Glass Scatter—U.S. Pat. No. 4,738,726 col.11, lines 34–52

Particle size—Sedimentation using Sedigraph® 5100 particle size analyzer—Values reported as microns (equivalent spherical diameter)

Hunter "L" "a" and "b" values were measured using the equipment and procedures described in U.S. Pat. No. 5,011,534, Young, col. 8, l. 45–66.

In the Einlehner Abrasion test, the weight loss of a wire disc contacted by a rotary abrader and test material is used a relative measure of the abrasiveness of the test material. Details of the procedures and equipment used to obtain values reported in this application are described in U.S. Pat. No. 5,393,340 (supra).

EXAMPLE 1

This example illustrates the presently preferred embodiment of the invention involving the steps of extensive wet grinding of a No. 2 fraction of a flotation beneficiated kaolin clay followed by controlled removal of plus 2 microns particles from the ground clay to achieve a high purity ultrafine particle size kaolin suitable as calciner feed to produce 96% brightness calcined kaolin. In a control test representing a method for producing high brightness calcined clay, outside the scope of the invention a portion of the same flotation beneficiated clay was fractionated to about the same particle size distribution and used a calciner feed without intermediate grinding and fractionation steps. The example demonstrates both the improvement in product yield and product quality achieved by practice of the process of the invention.

In these tests, the crude was a soft coarse white kaolin crude from Middle Georgia. The crude was of the type known to provide a No. 2 coating fraction responsive to the froth flotation beneficiated process known in the art as ULTRAFLOTATION.

The crude was degritted in conventional manner in a dragbox using a 40% solids slurry of crude. The overflow was passed to a product tank. The degritted crude in the product tank was 60.4% by weight finer than 2 microns and contained 1.78% (wt.) $TiO_2$ and 0.36% (wt.) $Fe_2O_3$. Brightness was 80.1%. Grit content (+325 mesh, US Sieve) was 0.949%. The degritted crude was dispersed with sodium silicate and fractionated in conventional manner in a centrifuge to a typical No. 2 kaolin cut, i.e., 99.3% finer than 10 microns, 94.2% finer than 5 microns, 76.2% finer than 2 microns and 60.8% finer than 1 micron. The fractionated dispersed feed was then processed by ULTRAFLOTATION to reduce the $TiO_2$ level in conventional manner using a fatty/rosin acid collector, calcite "carrier" and an alumsilicate hydrosol dispersant at pH 8.1. The purified kaolin recovered as the underflow product had an unbleached brightness of 86.3% and contained 0.47% $TiO_2$ and 0.44 $Fe_2O_3$. The flotation treatment removed some of the coarse particles; consequently, the relative proportion of fines increased. Thus, about ⅓ of the $TiO_2$ was removed by flotation but $Fe_2O_3$ concentration increased because removal of coarse particles resulted in concentration of fines which were richer in iron. The combined recovery from the degritting step and the flotation was 60.7% by weight.

PROCESS OF THE INVENTION

In accordance with this invention, a 10 gallon sample of the flotation purified fractionated kaolin was placed in a delaminator with 0.5#/ton of C-211 sodium polyacrylate dispersant and 50% bead volume of 0.75 mm glass beads for one hour. The particle size of the kaolin discharged from the delaminator was 95.9% finer than 2 microns and 86.8% finer than 1 micron. Since the feed to the delaminator was about 76.2% finer than 2 microns and 60.8% finer than 1 micron, approximately 20% by weight of additional particles finer than 2 microns were generated as a result of the grinding treatment; approximately 26% by weight of additional minus 1 micron clay was generated during the grinding step.

To convert the flotation beneficiated ground kaolin into suitable calciner feed, this intermediate product was fractionated in a laboratory centrifuge under conditions selected to remove substantially all of the particles larger than 2 microns while maximizing the recovery of particles finer than 1 micron for use as calciner feed. The resulting fine fraction (calciner feed) was 97.1% finer than 2 microns and 88% by weight finer than 1 micron. This fine fraction was recovered at 21.1% solids. The coarse (discard) fraction was 71.0% minus 2 micron and 41.9% finer than 1 micron. From these data, it was calculated that the recovery of the minus 1 micron particles in the fractionation step was 95.5%. The total calculated recovery of calciner feed was 57.9% based on the 60.7% weight recovery of clay after degritting and flotation.

The recovered fine fraction was bleached in a conventional manner (flocculation with sulfuric acid to pH 3.0 and bleaching with 6#/ton sodium hydrosulfite). The slurry of bleached kaolin was filtered and rinsed with water using about one part by weight water to one part by weight clay. The filter cake was dispersed by adding 5#/ton sodium polyacrylate at pH 6.2 and spray dried in a conventional manner. The brightness of the spray dried kaolin was 90.7%.

CONTROL PROCESS

For purposes of comparison, a portion of same flotation beneficiated fractionated kaolin used in carrying out the process of the invention (supra) was fractionated in a laboratory centrifuge to a particle size distribution substantially the same as that of the calciner feed described above, i.e., 97.9% minus 2 microns and 88.8% minus 1 micron. The coarse fraction was 38.9% finer than 2 microns and 14.9% finer than 1 micron. In this test, the flotation beneficiated clay was not subjected to a grinding step before or after flotation. Thus, all of the minus 2 micron and all of the minus 1 micron particles in the calciner feed originated in the kaolin crude whereas in the process of the invention, most of the minus 1 micron particles and a substantial proportion of the minus 2 micron particles were produced during grinding.

The recovery for the fractionation step was calculated to be 62%. The total recovery based on a 60.7% recovery of clay after degritting and flotation was only 37.6%.

This product was then bleached, filtered and rinsed as described above and redispersed to pH 6.3 with 5.5 #/ton of the same polyacrylate dispersant and spray dried.

Table I is a summary of properties of the calciner feeds obtained by the control process and the process of the invention.

All spray dried samples were pulverized by 3 passes through a MIKROPULVERIZER® mill with a 0.020 inch screen. Pulverized products were calcined in open trays in a muffle furnace at 2000° F. for 52 minutes and repulverized in the same pulverizing mill with the same screen.

In Table II, properties of the calcined products are compared.

Data in Table II show that the control process for making calcined clay from a coarse floated clay resulted in a 96.1% brightness, and a 294 black glass scatter value. These values are acceptable to a papermaker, but this method resulted in a relatively highly abrasive clay, (26.1 mg Einlehner). Such an abrasion value is unacceptable to many papermakers. Furthermore, the clay producer would normally not use this method because it gives a poor yield, 29.3% compared to a 52.3% yield commonly attained by using a hard kaolin to obtain a 93 brightness calcined kaolin.

The surprising benefits that were realized as a result of the process of the invention are that the process of the invention increases the yield to 45.2% and resulted in an Einlehner abrasion which was 20% lower. The 45.2% yield makes the product acceptable to the clay producer. This process produces a calcined clay that has a high brightness (96.1%) and acceptable scatter (283) which when combined with the low Einlehner abrasion of approximately 20 mg loss produces a product that is valued by paper customers. Obtaining the high brightness, low Einlehner, acceptable scatter and high yield are the key factors that make this a viable commercial process.

EXAMPLE 3

Tests were carried out to determine the results of calcining flotation beneficiated, ultrafine fractions of kaolin clay without a grinding step. The ultrafine fractions, subjected to the calcination treatment, had a particle size distribution similar to the fine fractions processed in the McConnell et al patent.

TABLE I

EFFECT OF PROCESSING ON PROPERTIES OF CALCINED FEED

| | WT % RECOVERY, BASED ON | | | | PSD OF FEED, MICRONS | | | |
|---|---|---|---|---|---|---|---|---|
| PROCESS | FRACTION | DEGRITTED CRUDE | $Fe_2O_3$ WT % | $TiO_2$ WT. % | 0.3 | 0.5 | 1 | 2 |
| | | | | | WT. % FINER THAN | | | |
| Control | 62 | 37.6 | 0.282 | 0.481 | 38.8 | 63.7 | 88.9 | 97.9 |
| Invention | 95.5 | 60.7 | 0.207 | 0.468 | 33.6 | 62.1 | 88.8 | 97.1 |

TABLE II

COMPARISON OF PROPERTIES OF CALCINED KAOLIN PIGMENTS

| PROCESS | GE BRIGHTNESS % | ABRASION EINLEHNER % | BLACK GLASS SCATTER $m^2/g$ | POROSITY Pore Vol cc/g/Pore Radius Angstrom | PSD OF PRODUCT, MICRONS | | | |
|---|---|---|---|---|---|---|---|---|
| | | | | | 0.5 | 0.75 | 1 | 2 |
| | | | | | WT. % FINER THAN | | | |
| Control | 96.1 | 26.1 | 294 | 0.975/3000 | 6.3 | — | 49.7 | 84.4 |
| Invention | 96.1 | 18 | 283 | 0.998/3500 | 4.3 | — | 38.2 | 68 |

EXAMPLE 2

Another possible way to manufacture a high brightness, low abrasion, good light scattering calcined pigment would be to use a commercially available, extremely high purity halloysite (a species of kaolin minerals). A commercial sample of such material having a brightness of 88%, $Fe_2O_3$ content of 0.31% and a $TiO_2$ content of 0.12% was obtained. This material was pulverized three times through a 0.39 inch screen and calcined at 1950° F. for various periods of time in a muffle furnace. After calcination, the material was pulverized (two passes) through a 0.039 inch screen. Based on the inability of produce products with low abrasion in previous testing with clay of this origin, samples were pulverized three passes through the 0.039 inch screen when carrying out the Einlehner test. Also, the pulverized material was slurried to 15% solids and then screened through a 100 mesh screen before testing for Einlehner abrasion. Calcined pigments having 96+% GE brightness were obtained at calcination time 20 minutes or more, but the black glass scatter ranged from only 182–204 (too low to be effective); Einlehner abrasions values ranged from 37.2 to 41.5 mg loss. Clays from these samples do not have the light scattering capacity and are too abrasive to be sold in most segments of the paper markets.

Thus, merely calcining a high brightness, high purity kaolin mineral that is low in iron and low in titania may result in a high brightness calcined pigment but does not necessarily result in desired opacification and low abrasion.

These fractions were obtained from fine particle size fractions of kaolin previously purified to remove colored impurities by TREP or by ULTRAFLOTATION. In the case of kaolin purified by TREP, all of the kaolin was from a soft Georgia kaolin crude. In the case of kaolin purified by ULTRAFLOTATION, the feed was a mixture of soft and hard kaolins.

In both tests, a 90% <2 micron fraction of flotation purified kaolin, obtained as a dispersed low solids slip, was cut to 90–95% <0.5 micron using a Merco nozzle bowl centrifuge.

Samples of the ultrafine clay were flocculated with sulfuric acid and bleached with 10#/t of sodium hydrosulfite.

The bleached pulps were filtered and washed with water (1:1 by weight). The filter cakes were redispersed with sodium polyacrylate dispersant, spray dried, pulverized and calcined as in Example 1.

The feeds were as follows: TREP—0.41 wt % $Fe_2O_3$, 0.64 wt % $TiO_2$ and particle size distribution of 91% <2 micron, 75% <1 micron and 51% <0.5 micron Ultraflotation—0.70 wt. % $Fe_2O_3$, 0.70 wt. % $TiO_2$ and particle size distribution of 90% <2 micron, 79% <1 micron and 61% <0.5 micron.

The results are summarized in Tables III and IV.

TABLE III

Effect of Processing and Feed on Properties of Calcined Feed

| Feed | Wt % Recovery Based on Based on Frac. | Wt % Recovery Based on Degritted Crude | % Fe₂O₃ wt. | % TiO₂ wt. | PSD of Feed (Microns) 0.3 Wt. % Finer Than | PSD of Feed (Microns) 0.5 | PSD of Feed (Microns) 1 | PSD of Feed (Microns) 2 |
|---|---|---|---|---|---|---|---|---|
| TREP | 29.8 | 12.1 | 0.42 | 0.7 | 62.2 | 89.3 | 98.5 | 99.5 |
| Ultraflotation | 95.2 | 26.2 | 0.74 | 0.54 | 79.9 | 93.5 | 97.2 | 98.4 |

TABLE IV

Comparison of Properties of Calcined Kaolin Pigments

| Feed | Brt. % | Einlehner Abrasion, mg | Black Glass Scatter | Porosity Pore Vol/ Pore Radius | PSD of Product (Microns) 0.5 Wt. % Finer Than | PSD of Product (Microns) 0.7 | PSD of Product (Microns) 1 | PSD of Product (Microns) 2 |
|---|---|---|---|---|---|---|---|---|
| TREP | 96.9 | 26.7 | 344 | 1.33/2700 | 19.3 | 51.6 | 79.4 | 95.9 |
| Ultraflotation | 95.2 | 19.1 | 307 | 1.22/2199 | 22.4 | 49.7 | 70 | 87 |

Data in Table IV show that the calcined ultrafine, flotation beneficiated clay made by the TREP process had high brightness but higher abrasion than desired. The ULTRAFLOTATION process resulted in a calcined product having brightness below 95.5% but with low abrasion. However, in both cases, yields were poor. See data in Table III.

EXAMPLE 4

This example demonstrates that equivalent products can be obtained by processing of full fraction of floated feed or fractioned floated kaolin made from the same feed. The processing was essentially the same as the one described in detail in Example 1. The feed had been beneficiated by the TREP process. The full fraction product had an initial impurity content of 0.44% $Fe_2O_3$ and 0.46% $TiO_2$; particle size distribution was 61.3% <2 micron, 48.9% <1 micron, 32.1% <0.5 micron, and 18.9% <0.3 micron. The product obtained by centrifuging the full fraction in a Bird centrifuge had an impurity content of 0.5% $Fe_2O_3$ and 0.5% $TiO_2$; particle size distribution of 80.9% <2 micron, 65% <1 micron, 54.8% <0.7 micron and 43.9% <0.5 micron. Results are summarized in Tables V and VI.

TABLE V

Effect of Processing and Feed on Properties of Calcined Feed

| Feed | Wt % Recovery Based on Based on Frac. | Wt % Recovery Based on Degritted Crude | % Fe₂O₃ wt. | % TiO₂ wt. | PSD of Feed (Microns) 0.3 Wt. % Finer Than | PSD of Feed (Microns) 0.5 | PSD of Feed (Microns) 1 | PSD of Feed (Microns) 2 |
|---|---|---|---|---|---|---|---|---|
| Full Frac. | 66.4 | 49.8 | 0.46 | 0.47 | 40.8 | 67.7 | 91.8 | 98.8 |
| Bird Frac. | 89.4 | 45.8 | 0.5 | 0.57 | 36.4 | 62.1 | 89.4 | 98.7 |

TABLE VI

Comparison of Properties of Calcined Kaolin Pigments

| Feed | Brt. | Einlehner Abrasion, mg. | Porosity Pore volume/ Pore radius | PSD of Product (Microns) 0.5 Wt. % Finer Than | PSD of Product (Microns) 0.7 | PSD of Product (Microns) 1 | PSD of Product (Microns) 2 |
|---|---|---|---|---|---|---|---|
| Full Frac. | 96.5 | 20.7 | 1.19/3000 | 11.2 | 34.8 | 65.3 | 93 |
| Bird Frac. | 96.5 | 21.5 | 1.23/3100 | 10.1 | 33.9 | 64.9 | 93.8 |

Using pigments of the invention as a furnish constituent in the manufacture of uncoated specialty printing papers, products can meet or even exceed brightness demand and can substantially reduce the cost of raw materials by replacing some of the pulp fiber in the furnish. Recycled specialty papers, at least comparable in quality to paper produced from virgin fibers, can be manufactured. A less expensive grade of recycled pulp can be used to achieve the same sheet brightness achieved using 93% brightness calcined kaolin. There is essentially no difference in opacity between the commercial Ansilex 93 pigment and a 96% brightness pigment of the invention. However, since opacity is a function of light absorption and scatter, one would expect the pigment of the invention to have higher scatter (due to its greater porosity e.g., by approximately 0.100 cc/g and lower absorption due to higher brightness. The effects of the factors tend to cancel each other out in paper; thus, paper sheets filled with the 96% brightness pigment of the invention would have higher brightness with equivalent opacity as compared to sheets filled with 93 brightness calcined kaolin.

We claim:

1. An improved process for producing an ultra high brightness, low abrasion kaolin clay pigment from a soft kaolin clay crude which comprises:

a) selecting a crude that contains less than 2.0% by weight of quartz, mica and smectite minerals in the minus 2 micron fraction, removing grit from said crude and recovering degritted unfractionated crude that is from about 50–65% by weight finer than 2 microns, e.s.d.;

b) subjecting the degritted unfractionated crude to froth flotation, selective flocculation or combinations thereof to remove colored titania and optionally ferruginous impurities and produce a purified unfractionated kaolin product containing from 0–1.8% $TiO_2$ and 0–0.8% $Fe_2O_3$;

c) agitating the product of step (b) with particulate grinding media until about 85–92% by weight is finer than 2 microns e.s.d.;

d) removing sufficient kaolin particles from the product of step (c) to produce calciner feed that is about 95–100% by weight finer than 2 microns and about 88–92% by weight finer than 1 micron and represents at least 40% by weight of the degritted kaolin; recovering a resulting fractionated product;

e) spray drying the resulting recovered fractionated product from step (d) and pulverizing, fully calcining and repulverizing the spray dried product in a conventional manner;

f) and recovering the calcined product having a G.E. brightness of at least 95%, an Einlehner abrasion below 25 and a white color as measured by an L value greater than 98.

2. An improved process for producing an ultra high brightness, low abrasion kaolin clay pigment from a soft kaolin crude which comprises:

a) selecting a soft kaolin clay crude that contains less than 2.0% by weight of quartz and mica in the minus 2 micron fraction thereof, b) removing grit from said crude, c) fractionating the degritted crude and recovering a fine size fraction thereof that is about 60 to 85% by weight finer than 2 microns, e.s.d., d) subjecting the recovered fraction from step (c) to flotation, selective flocculation or combinations thereof to remove colored impurities and recovering the fraction of clay that contains from 0–0.8% $TiO_2$ and from 0–0.8% $Fe_2O_3$, e) agitating the fraction of kaolin with particulate grinding media until from 95–100% by weight is finer than 2 microns, e.s.d., f) removing sufficient particles larger than 2 microns e.s.d. from the fraction of step (e) to result in calciner feed that is 90–95% finer than 1 micron, e.s.d., and represents at least 50% by weight of the degritted crude from step (b); recovering a resulting fractionated product;

g) spray drying the recovered product of step (f), pulverizing, fully calcining and repulverizing in conventional manner and;

h) recovering the calcined product having a GE brightness of at least 95%, and Einlehner abrasion below 25 and a white color as measured by an L value greater than 98.

3. A fully calcined kaolin pigment having a GE brightness of at least 95%, an Einlehner abrasion below 25, a white color, and pore volume of 1–1.3 cc/g.

4. The pigment of claim 3 which has a GE brightness of 95.5% or higher.

5. The pigment of claim 3 which has a GE brightness of 96.0% of higher.

6. Paper coated with the kaolin product of claim 3.

* * * * *